United States Patent Office 3,436,627
Patented Apr. 1, 1969

3,436,627
SERVOCONTROL SYSTEM
Yoshihisa Miyazaki, Yokohama-shi, Moritada Kubo and Yukiharu Takahashi, Tokyo, and Tatsuya Uetani, Miura-gun, Kanagawa-ken, Japan, assignors to Tokyo Shibaura Electric Co., Ltd., Kawasaki-shi, Japan, a corporation of Japan
Filed July 29, 1965, Ser. No. 475,726
Claims priority, application Japan, Aug. 6, 1964, 39/44,164; Sept. 9, 1964, 39/51,794; Sept. 30, 1964, 39/55,532
Int. Cl. H02p 5/46
U.S. Cl. 318—18                                6 Claims

ABSTRACT OF THE DISCLOSURE

A servosystem wherein a drive motor also drives a tachometer which provides rotational speed information in one leg and a combination photo-potentiometer and light source providing positional information in a second leg. The signals provided by the photo-potentiometer and tachometer are interrelated to provide an error signal which is fed back to the drive motor.

---

This invention relates to a servocontrol system and more particularly to an improved clutch servoactuator adapted to control such mechanical elements as valves, dampers, power cylinders and the like.

The present theories relating to servocontrol (L. S. Pontryagin et al., The Mathematical Theory of Optimal Processes, Interscience Publishers, 1962 edition) do not involve any dead time. On the other hand if the controlled object is subjected to a dead time, and, no determinate control method has as yet been proposed to account for dead time. Most methods involve a provision for a compensating element, in parallel with a relay element, that controls the controlled object so as to provide a local feedback. Thus the dead time of the transfer function of the controlled object is compensated by the dead time of the transfer function of the compensating element. While such a so-called parallel compensating method seems a very simple method, theoretically, it is very difficult to construct a circuit for the compensating element capable of compensating for the dead time of the controlled object. Even if a suitable circuit were obtained, it would result in self-oscillation caused by a change in the transfer function of the controlled object.

As is well known to those skilled in the art utilization of a speed feedback method is effective to prevent self-excited oscillations caused by dead time. According to this method a quantity proportional to the position of the controlled object and a derivative of the position or a quantity proportional to speed are used as negative feedback to the input. By such a control system it is possible to decrease the amplitude as well as the period of self-excited oscillation by increasing the speed feedback quantity. However when the speed feedback quantity is increased in order to decrease the oscillation, the relay element will chatter, thus shortening the useful life of the relay element. Moreover, it requires a long time for the system to become stable, thus decreasing the response speed. It is thus clear that to decrease self-excited oscillation and speed up the response speed causes a contradiction in the system.

Accordingly, when the above described speed feedback method is applied to a valve actuator utilizing a clutch servomechanism, for example it will require a long time for the valve to reach the desired degree of opening in response to a step input, which is of course undesirable.

For suitable control of an automation process, it is often required to change the operation characteristic of a final controller, for instance, valve-actuator, serving in a process line. However the operation characteristics of the conventional valve-actuators are inherently fixed to its original design so that in order to vary said characteristic it is necessary to remodel the design of the actuators themselves. In the continuous operation of a process this remodeling is not always practical from the economical point of view.

In addition, clutch servoactuators must have high reliability as for all other devices of process automation. While an actuator is continuously operated in response to a reference value and the position of the actuator is continuously detected by a potentiometer, wear and poor contact of the sliding contact thereof will decrease reliability and accuracy of control performance.

Accordingly it is the principal object of this invention to provide a reliable servocontrol system.

A specific object of this invention is to provide an improved clutch servoactuator which can provide adequate control.

A further object of this invention is to provide a novel servo-control system which can suppress self-excited oscillations in the system and has a fast response speed.

Still a further object of this invention is to provide an improved servo-actuator, the operating characteristics thereof may be varied as desired to provide the most suitable control.

Yet another object of this invention is to provide a servo-control system wherein a noncontact type potentiometer is used as a position detector to provide adequate control.

Briefly stated according to a preferred embodiment of this invention a servo-control system is provided comprising a photoelectric potentiometer to detect the position of a controlled object such as a valve, a damper, a power cylinder and the like; a pilot generator, such as a tacho-generator to detect the speed of the controlled object; a nonlinear speed feedback element, such as limiter circuit, which produces a variable speed feedback quantity in response to a speed signal; a comparator to compare the sum of the output of the speed feedback element and the output of said potentiometer with a reference value; a relaying amplifier to amplify the error obtained by said comparator; driving means to drive said controlled object; and, means responsive to the output from said amplifier to control said driving means. The potentiometer is made to have a nonlinear characteristic to vary the operation characteristics of the final controller as desired. It is advantageous to construct the potentiometer in the form of a photoconductive potentiometer so as to improve its long life reliability.

This invention may be more fully understood from the following detailed description taken in connection with the accompanying drawings in which.

Figure 1:
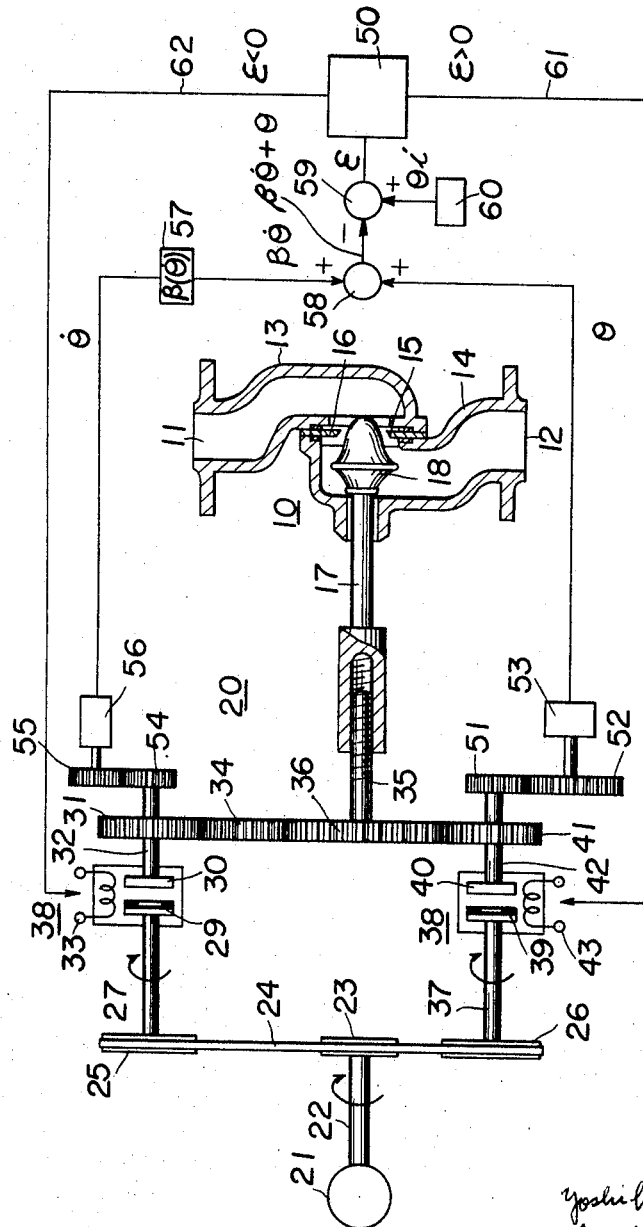
FIG. 1 shows a schematic diagram of a clutch servo-valve actuator embodying this invention.

Referring now to FIG. 1 of the accompanying drawing a valve 10 comprises a pair of conduits 13 and 14 each including an inlet port 11 and an outlet port 12, respectively, for a fluid, the inner ends of these conduits being connected together with packings 15 and a valve seat 16 interposed therebetween. Opposite to the valve seat 16 is a valve plug 18 supported by a valve stem 17 which is reciprocated by a clutch servoactuator 20. The clutch servoactuator comprises a forward pulley 25 and a backward pulley 26 which are constantly driven in one direction by an electric motor 21 through a shaft 22, a pulley 23 mounted thereon and a driving belt 24 passing around the pulleys 23, 25 and 26. At one end of a shaft 27 of the pulley 25 is secured one of the discs 29 of a forward electromagnetic clutch 28, the opposite disc 30 thereof being connected to a shaft 32 of a gear 31. The electromagnetic clutch 28 is provided with an exciting coil 33 which when energized couples together discs 29 and 30. The gear 31 is connected to a screw rod 35 through an idler gear 34 and a gear 36 secured to the screw rod 35, the threaded portion thereof being received in a threaded bore of the valve stem 17. Similarly a disc 39 of a backward electromagnetic clutch 38 is connetced to the end of the shaft 37 of the backward pulley 26, the other disc 40 of the clutch 38 being secured to one end of the shaft 42 of a gear 41. The eletcromagnetic clutch 38 is provided with an exciting coil 43 to couple together both discs 39 and 40. The gear 41 meshes with said gear 36.

With this arrangement energization of the exciting coil 33 of the forward electromagnetic clutch 28 will result in the coupling between discs 29 and 30 move in the forward direction valve stem 17 which is driven by the motor 21 through the pulley 25, the clutch 28, gears 31, 34 and 36. Conversely when the exciting coil 43 of the backward electromagnetic clutch 38 is energized both discs 39 and 40 are coupled together to transmit the power of the motor 21 to the valve stem 17 via the pulley 26, the clutch 38 and gears 41 and 36 so as to retract valve stem 17 and valve plug 18 away from the valve seat 16.

Electromagnetic clutches 28 and 38 are controlled by selectively energizing the exciting coils 33 and 43 by the output of relaying amplifier 50, which in turn operates in response to a difference between the sum of a position feedback quantity and a speed feedback quantity and a reference quantity. More particularly a gear 51 is secured to the opposite end of the shaft 42 and a potentiometer 53 which detects the position of the valve plug 18 is coupled to the gear 51 through a gear 52. Similarly a tachometer generator 56 detects the operating speed of the valve plug 18 is arranged to be driven by the shaft 32 through meshing gears 54 and 55. The velocity signal $\theta$ from the tachometer generator 56 is applied to an adder 58 through a coefficient element 57 and added in the adder with the position signal $\theta$ derived out from the potentiometer 53. Thus a position and speed feedback signal $\theta+\beta\theta$ is compared with a set signal $\theta i$ obtained from a setter 60 in a subtractor or comparator 59. The error signal $$\epsilon = \theta i - \theta - \beta\theta$$

obtained by comparison is applied to the relaying amplifier 50. Whether the error signal is positive or negative the relaying amplifier will respond to selectively energize the exciting coils of the clutches 28 and 38. Thus when $\epsilon>0$, then the amplifier 50 will, through wiring 61, energize the exciting coil 43 of the clutch 38 to retract the valve stem 17 so as to open more widely the valve plug 18. On the other hand when $\epsilon<0$, then exciting coil 33 will be energized to actuate clutch 28 thus causing the valve stem in the forward direction to decrease the degree of opening of the valve plug 18. When $\epsilon=0$, or when the valve plug 18 is at a position to provide desired degree of opening, the relaying amplifier will not give any output.

Figure 2:
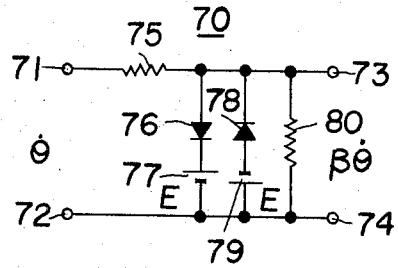
FIG. 2 is a connection diagram of a limiter circuit acting as a speed feedback component.

The speed feedback coefficient element 57 comprises a limiter circuit 70, as illustrated in FIG. 2. This circuit comprises a pair of input terminals 71 and 72 adapted to receive the speed signal $\theta$ of the tachometer generator 56 and a pair of output terminals 73 and 74. A resistor 75 is connected between terminals 71 and 73. Across the output terminals 73 and 74 are connected a series circuit including a semiconductor diode 76 and a source 77 of a constant voltage E and another series circuit including a semiconductor 78 and a source 79 of a constant voltage E, the polarities of said series circuit being opposite each other. Also a resistor 80 is connected across the output terminals.

Figure 3:
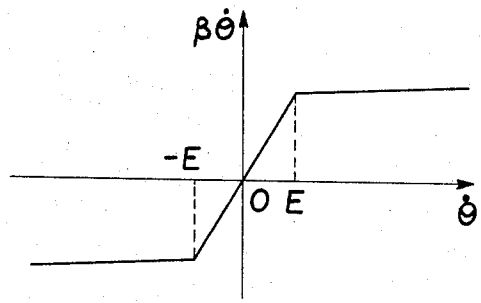
FIG. 3 shows a characteristic curve of the limiter circuit shown in FIG. 2.

The operation and characteristic of this limiter circuit will now be considered by referring to FIG. 3. If the signal $\theta$ impressed across input terminals 71 and 72 satisfies a condition $-E \leq \theta \leq E$ neither of the series circuits conducts current so that a signal $\beta\theta$ obtained by dividing input signal $\theta$ by the values of resistors 75 and 80 will appear across the output resistor 80. Since $\beta$ is constant within said range of $\theta$ the output signal $\beta\theta$ is proportional to the input signal $\theta$. However, when $\theta < -E$ or $\theta > E$, then either one of said two circuits containing a diode will conduct current to saturate the output signal $\beta\theta$. Now the $\beta$ is not constant but varies and is inversely proportional to the input signal $\theta$.

In this way, suppression of the speed feedback signal $\beta\theta$ by the saturating characteristic of the limiter circuit 70 when the absolute value of the speed signal $\theta$ is larger than a predetermined value prevents undue decreasing of the response speed of the control system, thus effectively preventing excessive chattering. On the other hand when the absolute value of the speed signal $\theta$ is smaller than said predetermined value, the speed feedback signal is proportional to the speed signal thus making it possible to suppress the amplitude of the self-excited oscillations which occur near the set point. Thus it will be seen that the clutch servo-actuator embodying this invention does not produce undesired self-excited oscillation and moreover can rapidly settle to the set point.

It will be understood that this invention is not limited to the particular limiter circuit shown in FIG. 2 and that any one of the numerous modifications thereof may be utilized. For example suitable Zener diodes may be substituted for the DC sources 77 and 79. Further, if desired, a limiter circuit known as a diode function generator may be used.

In this invention it is also possible to provide any desirable change of performance characteristic (nonlinear) of the servo-valve by proper change of the nonlinearity of the feedback potentiometer 53.

When the valve opening or lift of valve has a linear proportional relation with respect to flow quantity, it is said that the valve has a linear performance characteristic. In the following, it is explained how the fixed valve performance characteristic can be changed to any other desired characteristic only by the adequate change of the nonlinearity of the feedback potentiometer 53, and thus any change in mechanical design of the valve is not required.

Figure 4:
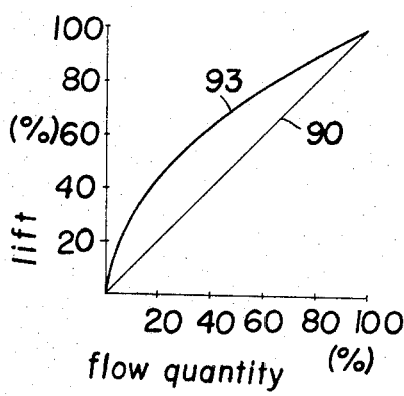
FIG. 4 is a plot to explain the relation between the lift and flow quantity of a valve.
Figure 5:
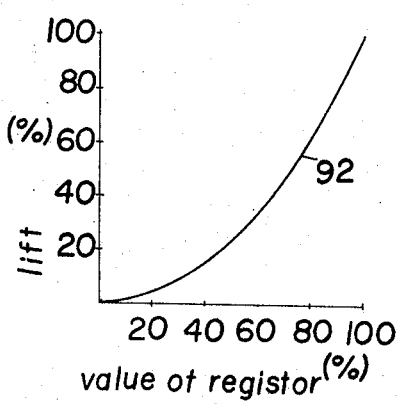
FIG. 5 shows characteristic curves of a position feedback potentiometer.

Referring now to FIG. 4, a straight line represents a linear characteristic inherent to the mechanical design of the valve. The characteristic curve 93 is known as a V-port opening characteristic and is now the desired characteristic. Now the problem is how we can remodel linear characteristics of valve inherent to its mechanical design, without mechanical remodeling, to make the valve actuator to have the nonlinear V-port characteristics such as a curve 93 in FIG. 4.

We can attain this purpose as follows: when a linear characteristic potentiometer is used for the set potentiometer 60, the position feedback potentiometer 53 is made to have nonlinearity, just the same characteristic as a curve 92.

Consequently, V-port flow characteristics of the valve as curve 93 shown in FIG. 4 can easily be attained without remodeling the inner valve, by only changing the nonlinearity of the feedback potentiometer 53. Therefore by using the nonlinear position feedback potentiometer and only one type of inner valve any flow quantity curve, viz., lift of valve or valve opening such as equal percent P-port or V-port, liner, or quick opening characteristic can be obtained.

Figure 6:
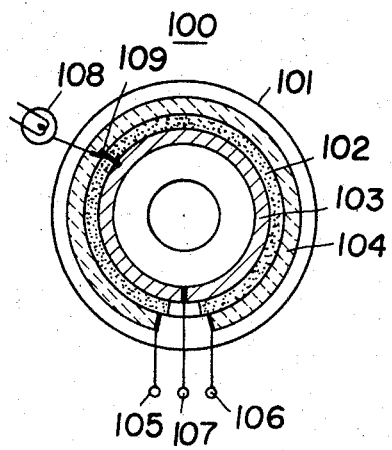
FIG. 6 is a plan view of a photoelectric potentiometer for position feedback embodying this invention.
Figure 7:
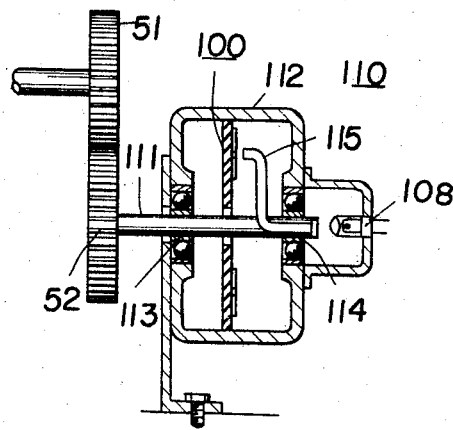
FIG. 7 is a side view, partly in section, of the photoelectric potentiometer shown in FIG. 6.

While a slide contact potentiometer is commonly used as the position feedback potentiometer if the potentiometer were constructed as a no-contact type then the reliability of the actuator could be greatly improved. FIG. 6 illustrates one example of a photoconductor assembly 100 which may be used as the potentiometer 53. The assembly comprises an annular base plate or substrate 101 of a suitable insulator and a film 102 of a suitable photoconductive substance, CdS, or CdSe, for instance, deposited on the base plate by sintering or vapor deposition method. On the inner surface of the photoconductive film 102 is formed a conductive film 103 of metal while a resistance film 104 is applied onto the annular portion of substrate, outside of the photoconductive film by brushing or vapor deposition. At the opposite ends of this resistance film are provided a pair of terminals 105 and 106 adapted to be connected to a source constant voltage, while the conductive film 103 is provided with an output terminal 107. The light beam emitted from an electric lamp 108 is focussed in the form of a narrow band 109 whereby the resistance of that portion of the photoconductive film 102 illuminated by said light beam will be decreased to effectively short circuit the conductive film 103 and the resistance film 104. Thus, a voltage corresponding to the position illuminated by light beam will appear terminals 105 and 107 or across terminals 106 and 107. A photoconductive potentiometer 110 schematically shown in FIG. 7 comprises a shaft 113 extending into a dark box 112, driving gears 51 and 52, and a pair of bearings 113 and 114 for journalling the shaft 111. Fixed to the shaft 111 is a light guide 115 of a fibre optics type, one end thereof opposing to the light source 108 and the opposite end opposing to the photoconductive film of a photoconductive resistance assembly fixedly mounted in the dark box 112 so as to transmit light beam to the photoconductive film. As a result it is possible to obtain a voltage corresponding to the position of the gear 51 without utilizing any contacting or sliding portion. The photoconductive resistance element shown in FIG. 7 is generally the same as that shown in FIG. 6.

Figure 8:
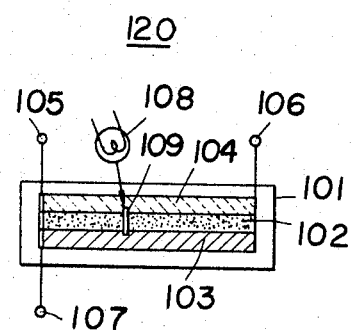
FIG. 8 is a plan view of a modified photoelectric potentiometer.

FIG. 8 shows a modified photoconductive resistance assembly 120 wherein a narrow band of light beam 109 is moved rectilinearly. Other components are identical to those shown in FIG. 6 so that the corresponding parts are designated by the same reference numerals.

Figure 9:
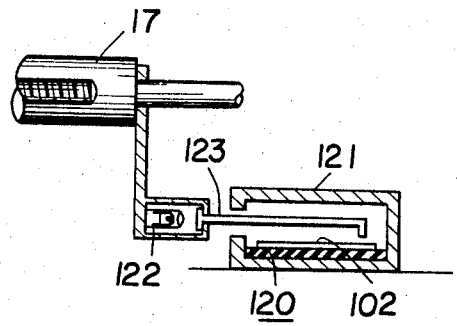
FIG. 9 is a side view, partly in section, of the photoelectric potentiometer shown in FIG. 8.

In FIG. 9 the photoconductive resistance assembly 120 of FIG. 8 is horizontally disposed in a dark box 121 and the light beam from a lamp 122 fixedly mounted on the valve stem 17 is transmitted on to the photoconductive film 102. By this arrangement also, a signal corresponding to the position of the valve stem 17 can be obtained.

Since according to this invention a photoelectric potentiometer is substituted for the conventional electromechanical potentiometer troubles caused by wear, poor contact and the like inherent to the latter are eliminated. Further utilization of a nonlinear limiter circuit eliminates undesirable self-excited oscillation in the control system.

While the invention has been described by illustrating preferred embodiments thereof it is to be understood that the invention is not limited thereto and that many modifications and alternations may be made therein within the true spirit and scope of the invention as defined in the appended claims. Thus, for example the servocontrol system of this invention may be applied to the automatic control of any desired controlled object other than a valve. Further in order to reciprocate the controlled object any one of many well known reversible drives may be used in view of reserving clutches, for example a reversible electric motor, a double acting piston cylinder assembly and the like.

What is claimed is:

1. A servo control system for controlling a controlled object (18), comprising in combination:
   (a) drive means (21 to 41) with coupling means (17) coupling said drive means to said controlled object to variably drive said controlled object in a predetermined manner to accomplish a predetermined objective;
   (b) first signal means (56) including first engaging means (54, 55) engaging said first signal means to said drive means generating a first electrical signal corresponding to the speed of said controlled object;
   (c) second signal means including second engaging means (51, 52) engaging said second signal means to said drive means and having a photoconductive potentiometer with a narrow light beam source disposed to direct a narrow beam of light across said photoconductive potentiometer said beam of light moving along said photoconductive potentiometer in accordance with the position of said controlled body, said photoconductive potentiometer generating a second electrical signal depending on the position of said light beam thereon;
   (d) comparison means including a summing point where said first and second electrical signals are fed and summed, and including a reference signal source, said summed signals being compared with a reference signal provided by said source, the difference between said compared signals serving as an error signal; and
   (e) actuating means coupled on the input side thereof to said comparison means and responsive to said error signal, and, coupled to said variable drive means on the output side thereof to drive said drive means in the manner to accomplish said predetermined objective.

2. The servocontrol system according to claim 1 wherein said photoelectric potentiometer includes a layer of conductive material, a layer of resistance material and a layer of photoconductive substance sandwiched between said first two layers, means to direct a narrow band of light rays across said three layers and means to move said narrow band of light rays along said layers in accordance with the position of said controlled body.

3. The servocontrol system according to claim 1 wherein said drive means are rotary drive means in the one or the other direction, and, said first signal means is a tachometer generator.

4. The servocontrol system according to claim 3 wherein said photoelectric potentiometer includes a layer of conductive material, a layer of resistance material and a layer of photoconductive substance sandwiched between said first two layers, means to direct a narrow band of light rays across said three layers and means to move said narrow band of light rays along said layers in accordance with the position of said controlled body.

5. The servocontrol system according to claim 1 wherein said photoconductive potentiometer comprises a photoconductive potentiometer having a nonlinear resistance.

6. A servocontrol system for controlling a valve, comprising in combination:
   (a) variable drive means with coupling means coupling said drive means to said valve to variably open and close said valve;
   (b) first signal means including first engaging means engaging said first signal means to said drive means generating a first electrical signal corresponding to the speed with which said valve acts;
   (c) second signal means including second engaging means engaging said second signal means to said variable drive means and having a position detector photoelectric potentiometer including a layer of conductive material, a layer of resistance material and a layer of photoconductive substance sandwiched between said first two layers, said three layers forming concentric circles, light means to direct a narrow beam of light along said photoconductive circular layer in accordance with the position of said controlled valve, said photoconductive potentiometer generating a second electrical signal depending on the position of said light beam thereon;

(d) comparison means including a summing point where said first and second electrical signals are fed and summed, and including a reference signal source, said summed signals being compared with a reference signal provided by said source, the difference between said compared signals serving as an error signal; and (e) actuating means coupled on the input side thereof to said comparison means and responsive to said error signal, and, coupled to said variable drive means on the output side thereof to drive said drive means in a manner to open and close said valve.

References Cited

UNITED STATES PATENTS

| | | | |
|---|---|---|---|
| 2,766,412 | 10/1956 | Stephenson | 318—28 |
| 3,114,869 | 12/1963 | Goodwin | 318—28 XR |
| 3,122,687 | 2/1964 | Romvari | 318—28 |
| 3,183,420 | 1/1965 | Westenskow | 318—18 |
| 3,310,738 | 3/1967 | Ogawa et al. | 318—28 XR |

B. DOBECK, *Primary Examiner.*